(12) United States Patent
Charpentier (10) Patent No.: US 7,320,181 B2
(45) Date of Patent: Jan. 22, 2008

(54) MASONRY GUIDING TOOL

(75) Inventor: Daniel Charpentier, St-Jean-sur-Richelieu (CA)

(73) Assignee: Charpenter Design Inc., St-Jean-sur-Richelieu, Quebec (CA)

( * ) Notice: Subject to any disclaimer, the term of this patent is extended or adjusted under 35 U.S.C. 154(b) by 26 days.

(21) Appl. No.: 11/251,780

(22) Filed: Oct. 18, 2005

(65) Prior Publication Data
US 2007/0084071 A1    Apr. 19, 2007

(51) Int. Cl.
*B43L 13/00* (2006.01)
*G01C 15/10* (2006.01)

(52) U.S. Cl. .............................. 33/407; 33/404; 33/406

(58) Field of Classification Search ........... 33/404–410
See application file for complete search history.

(56) References Cited

U.S. PATENT DOCUMENTS

| | | | |
|---|---|---|---|
| 2,881,532 A | 4/1959 | Boykin | |
| 2,952,915 A * | 9/1960 | Schrauder | ................... 33/406 |
| 3,571,931 A | 3/1971 | Williams | |
| 3,698,089 A * | 10/1972 | Huston | ......................... 33/408 |
| 4,970,797 A | 11/1990 | Sarasin | |
| 4,995,167 A | 2/1991 | Sanchez | |
| 5,136,785 A | 8/1992 | Shirley | |
| 5,274,929 A | 1/1994 | Tocci | |
| 5,933,974 A * | 8/1999 | Walters et al. | ................. 33/404 |
| 5,964,042 A * | 10/1999 | Carper | ........................ 33/407 |
| 7,055,256 B2 * | 6/2006 | Alecci | ......................... 33/404 |

* cited by examiner

*Primary Examiner*—Yaritza Guadalupe-McCall
(74) *Attorney, Agent, or Firm*—Louis Martineau (57) ABSTRACT

A masonry guiding tool for attachment to a backing wall, comprising a base member for attachment to the backing wall and an elbowed plumb line holder. The plumb line holder comprises an elongated mounting portion defining a first axis therealong, the mounting portion being movably carried by the base member and axially movable relative thereto along the first axis which is destined to be parallel to the backing wall. The plumb line holder also comprises an elongated plumb line support portion transversally connected to the mounting portion, the elongated plumb line support portion defining and extending along a second axis transversal to the first axis, the plumb line support portion for movably holding a plumb line. The guiding tool allows the plumb line to be movable along the first axis by axially moving the mounting portion relative to the base member, and along the second axis of the plumb line support portion by moving the plumb line along the plumb line support portion.

11 Claims, 7 Drawing Sheets

MASONRY GUIDING TOOL

CROSS-REFERENCE DATA

The present patent application claims the priority of the patent application No. 2,514,756 filed in Canada on Aug. 5, 2005.

FIELD OF THE INVENTION

The present invention relates to tools to assist in the laying of bricks, and more particularly to a masonry guiding tool for allowing masons to plumb their work.

BACKGROUND OF THE INVENTION

Masonry walls are made of stone or brick laid in stacked horizontal rows against a backing wall, made of plywood for example. To ensure that the masonry walls are properly aligned with respect to the backing wall, a mason starts by setting up the bricks (or stones or other masonry blocks) at the corner of the masonry wall in alignment with a corresponding corner on the backing wall, and then proceeds to fill in the rest of the masonry walls with brick.

Masonry guides have been used to aid the mason in the proper alignment of successive courses of brick, by providing him with a vertical reference line. For example, a rudimentary masonry guiding aid still used by masons are elongated 2"×4" planks suitably affixed to the backing wall in a horizontal fashion, into which a nail is driven for supporting a vertical plumb line. This technique involves setting up a relatively heavy and cumbersome 2"×4" plank in horizontal fashion using a spirit level, which can be a long and laborious task.

Alternately, masons can use dedicated masonry guiding tools. However, existing masonry guiding tools have been found to lack versatility or to involve an inconvenient set up procedure.

SUMMARY OF THE INVENTION

The present invention relates to a masonry guiding tool for attachment to a backing wall, comprising:
  a base member, for attachment to the backing wall; and
  an elbowed plumb line holder, comprising an elongated mounting portion defining a first axis therealong, said mounting portion movably carried by said base member and axially movable relative thereto along said first axis which is destined to be parallel to the backing wall, said plumb line holder also comprising an elongated plumb line support portion transversally connected to said mounting portion, said elongated plumb line support portion defining and extending along a second axis transversal to said first axis, said plumb line support portion for movably holding a plumb line;
wherein said guiding tool is for allowing the plumb line to be movable along said first axis by axially moving said mounting portion relative to said base member, and wherein said plumb line support portion is destined to movably carry the plumb line in order for the plumb line to be movable along said second axis of said plumb line support portion.

In one embodiment, said mounting portion and plumb line support portion are perpendicular to each other, and said first and said second axes are thus also perpendicular.

In one embodiment, said plumb line support portion defines a number of notches longitudinally spaced-apart therealong for engagement by a looped end of the plumb line.

In one embodiment, said mounting portion and said plumb line support portion are each substantially flat.

In one embodiment, said base member defines a wall attachment portion for attachment to the backing wall, a spacer portion attached to said wall attachment portion and carrying in turn a plumb line holder retaining portion attached to said spacer portion in spaced apart fashion from said wall attachment portion, said plumb line holder retaining portion thus carrying said mounting portion of said plumb line holder in spaced apart fashion from said wall attachment portion.

In one embodiment, said plumb line holder retaining portion is elongated and defines two ends, and comprises a plumb line holder retaining channel extending between said two ends along said first axis, and wherein said elongated plumb line support portion is slidably mounted in said plumb line holder retaining channel.

In one embodiment, said masonry guiding tool further comprises a spirit level attached to said base member.

In one embodiment, said masonry guiding tool further comprises releasable fixing means capable of releasably immobilizing said plumb line holder relative to said base member.

In one embodiment, said plumb line support portion of said plumb line holder is graduated.

In one embodiment, said mounting portion of said plumb line holder is graduated.

The invention also relates to a masonry guiding tool for attachment on a corner formed by two sides of a backing wall, comprising:
  an elongated plumb line holder defining a longitudinal axis;
  first and second wall attachment members each for attachment to a corresponding one of the two sides of the backing wall;
  a first pivot joint mounting said first and second wall attachment members to said plumb line holder about a common pivot axis; and
  a linkage attached to said first and second wall attachment members and to said elongated plumb line holder, said linkage biasing said plumb line holder relative to said first and second wall attachment members to always remain substantially equiangularly spaced from said first and said second wall attachment members.

In one embodiment, said linkage comprises a first linkage rod pivotally connected to said first wall attachment member at a second pivot joint and a second linkage rod pivotally connected to said second wall attachment member at a third pivot joint, said second and third pivot joint being substantially equidistantly spaced from said first pivot joint, said first and second linkage rods being further pivotally connected, in spaced-apart fashion from said second and third pivot joints respectively, to a unitary member movably connected to said elongated plumb line holder so as to be axially movable relative thereto along said longitudinal axis.

In one embodiment, said first and said second wall attachment members comprise complementary hinge members fitted together and held together by a kingpin, said hinge members and said kingpin forming in combination said first pivot joint, said kingpin defining a kingpin longitudinal axis coinciding with said first pivot axis.

In one embodiment, said elongated plumb line holder defines a number of notches longitudinally spaced-apart therealong for engagement by a looped end of the plumb line.

In one embodiment, each of said first and second linkage rods comprises first and second end portions, said first end portion of each of said first and second linkage rods is pivotally connected to a corresponding one of said first and second wall attachment members, and said unitary member is a gudgeon pin extending through said second end portions of both said first and second linkage rods to pivotally interconnect them, and wherein said plumb line holder defines an elongated groove made therein, extending in alignment with said longitudinal axis and slidably receiving said gudgeon pin, and wherein said gudgeon pin can axially move along said groove when said wall attachment members are pivoted relative to each other.

In one embodiment, said plumb line holder is graduated.

DETAILED DESCRIPTION OF THE EMBODIMENTS

Figure 1:
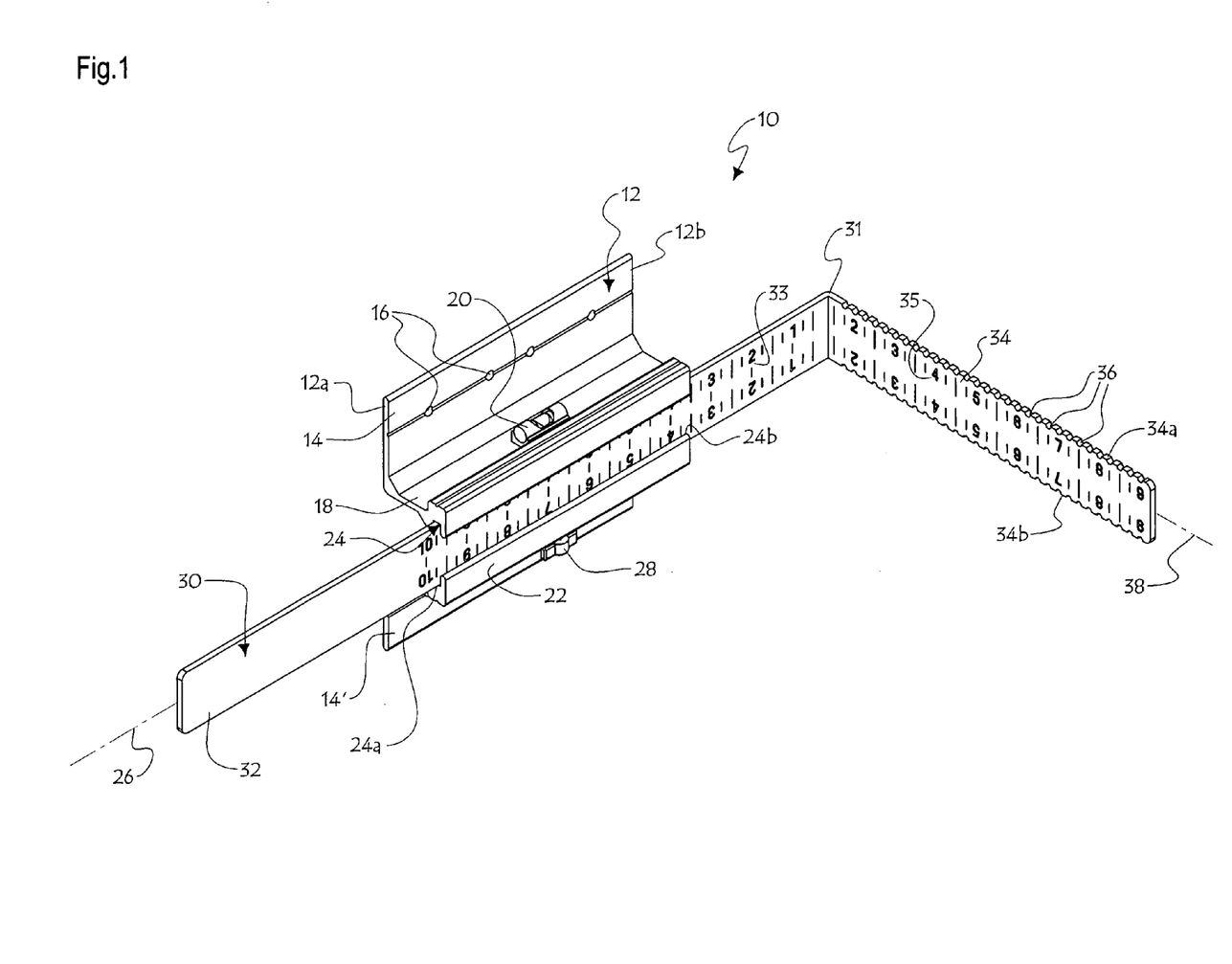
FIG. 1 is a front perspective view of a masonry guiding tool.
Figure 2:
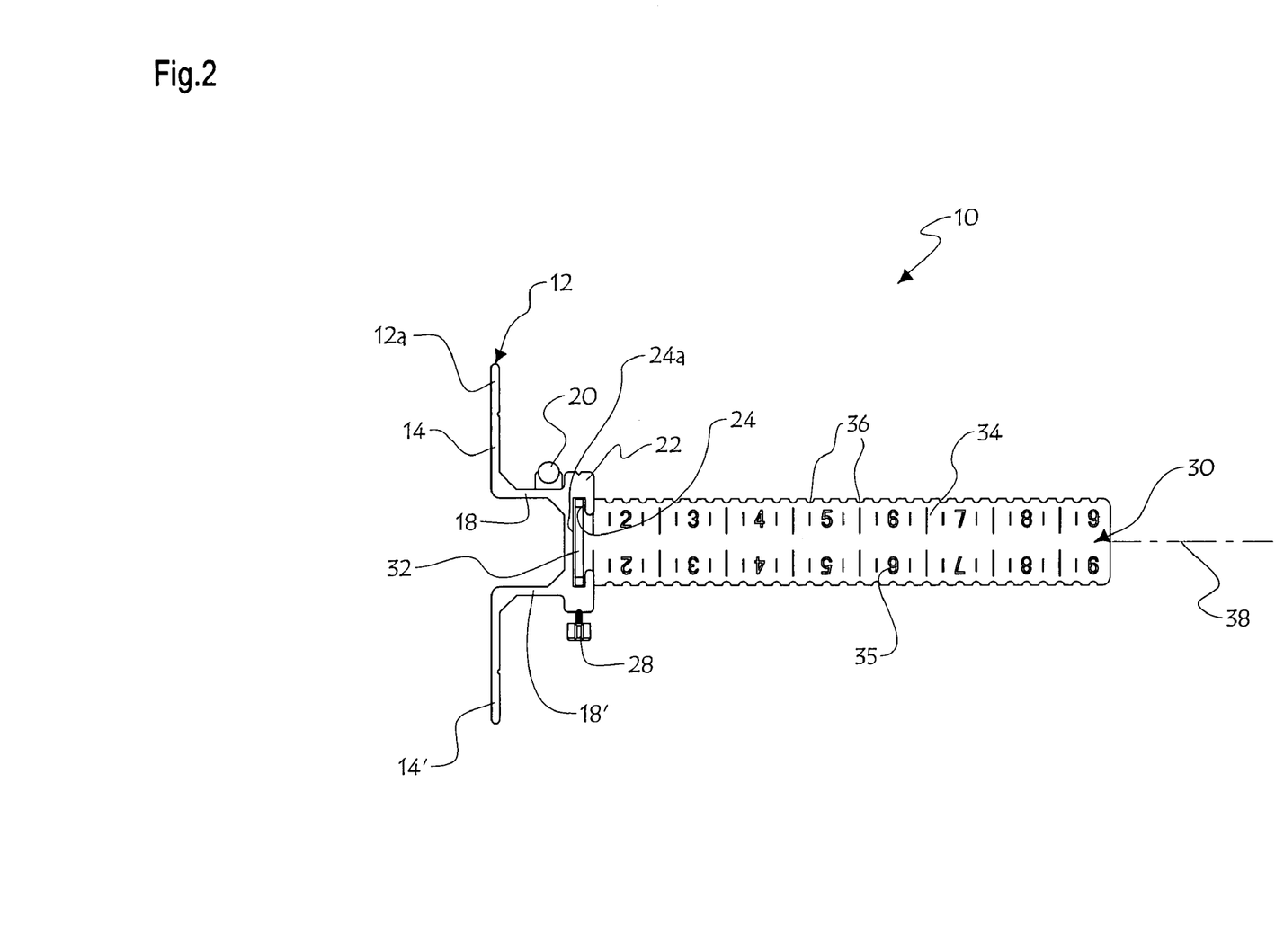
FIG. 2 is a side elevation view of the guiding tool of FIG. 1.
Figure 3:
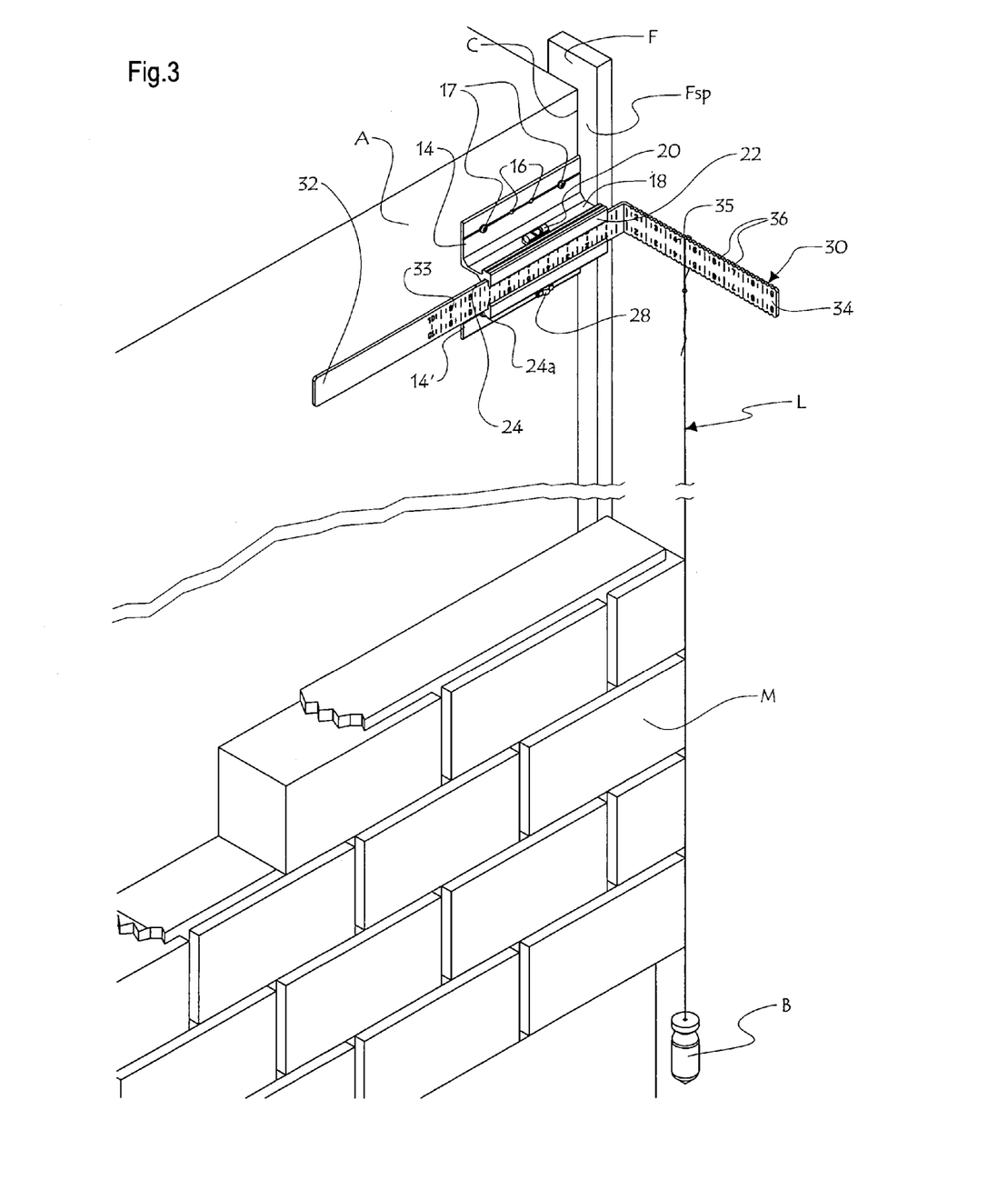
FIG. 3 is a front perspective view at a smaller scale of the guiding tool of FIG. 1 holding a plumb line and installed on a backing wall.

FIGS. 1-3 show a masonry guiding tool 10 according to the present invention, comprising a base member 12 carrying a plumb line holder in the form of an elbowed ruler 30. In the following description, guiding tool 10 will be described as being used for helping the mason erect a masonry wall made up of brick, but it is understood that the guiding tool 10 could be used in the erection of a masonry wall made up of stone or any other masonry blocks.

Base member 12 defines first and second lateral extremities 12a, 12b, and comprises a wall attachment portion in the form of a pair of substantially coplanar and elongated flanges 14, 14' extending between base member lateral extremities 12a and 12b. Each elongated flange 14, 14' is provided with a number of spaced apart screw holes 16 for penetration by screws or the like fasteners, for releasably anchoring base member 12 to a backing wall A (FIG. 3) of an unfinished building.

Base member 12 is also provided with spacing means in the form of a pair of spacer plates 18, 18', each plate 18, 18' being integrally and transversally connected to the inner edge of a corresponding flange 14, 14' away from the latter's wall-bearing surface (see FIG. 3), and extending longitudinally between lateral extremities 12a and 12b of base member 12. Upper spacer plate 18 fixedly carries a horizontal spirit level 20.

An elongated ruler retaining portion 22, of C-shaped cross-section as best shown in FIG. 2, is connected to and extends transversally between the edges of spacer plates 18, 18' opposite flanges 14, 14'. Retaining portion 22 extends between base member lateral extremities 12a, 12b, and defines a ruler retaining channel 24 of constant cross-section and extending lengthwisely along ruler retaining portion 22; ruler retaining channel 24 defines lateral ends 24a, 24b and a ruler sliding axis 26 extending therebetween.

Elbowed ruler 30 comprises a substantially planar elongated ruler mounting portion 32, slidably received within ruler retaining channel 24. A substantially planar plumb line support portion 36 is transversally and integrally connected at one end of ruler mounting portion 32; ruler mounting portion 32 and plumb line support portion 34 intersect at a ruler elbow 31. Plumb line support portion 34 defines a longitudinal axis 38, and top and bottom edges 34a and 34b about which are made a number of longitudinally and regularly spaced apart notches 36. These notches 36 are destined to be engaged by a loop knot tied at the upper end of a plumb line L slipped around plumb line support portion 34, as shown in FIG. 3.

It is noted that ruler 30 is movably held in base member 12 in spaced apart fashion from the backing wall A onto which the latter is destined to be affixed, since spacer plates 18, 18' space the ruler retaining portion 22 holding ruler 30 away from the wall-bearing surface of flanges 14, 14'.

The sliding engagement of the ruler's mounting portion 32 inside ruler retaining channel 24 of base member 12 enables elbowed ruler 30 to be slidably movable relative to base member 12 along ruler sliding axis 26. A releasable fixing means in the form of a set screw 28 is provided on base member ruler mounting portion 22 and extends into the ruler retaining channel 24 of base member 12. This set screw 28 can be tightened against the ruler's sliding portion 32 to clamp it to the ruler mounting portion 22 and thus to releasably immobilize it. Moreover, the upper looped end of plumb line L can be selectively axially moved along plumb line support portion 34 and along plumb line longitudinal axis 38.

As can be readily seen in FIGS. 1-3, both of the elongated, transversally connected portions of the elbowed ruler 30 have a measuring scale embossed, engraved or otherwise suitably imprinted thereon. The zero point of the measuring scale 33 of ruler mounting portion 32 coincides with ruler elbow 31 and extends towards the outer free end of ruler mounting portion 32. In the figures, scale 33 stops short of the outer free end of ruler mounting portion 32, but it could extend all the way thereto in an alternate embodiment. As for the measuring scale 35 of plumb line support portion 34, its zero point coincides with the virtual intersection between plumb line support portion 34 and the plane commonly occupied by the surfaces of flanges 14, 14' destined to bear against the backing wall A. The graduations on measuring scale 35 thus indicate distances from the backing wall A onto which base member 12 is affixed, hence allowing the mason to position the looped end of his plumb line L at the desired distance from backing wall A. This can be seen in exemplary fashion in the drawings, where the graduations on measuring scale 35 start at about 1.5 inches—indicating that about 1.5 inches separate backing wall A from the beginning of the measuring scale 35.

FIG. 3 shows an exemplary use of guiding tool 10. Guiding tool 10 is installed on a backing wall A adjacently to a corner C thereof, where a furring strip F is attached. As known in the art, a furring strip is a vertical post member attached to the backing wall, acting as spacer means intended to keep the masonry wall being assembled spaced apart from the adjacent backing wall A, SO that a layer of air separates the masonry wall M and the backing wall A. Accordingly, in order for a space to be created between the masonry wall M and the backing wall A, a spacing portion of furring strip Fsp projects frontwardly beyond the surface of the backing wall A being bricked.

Guiding tool 10 is anchored in a horizontal disposition to backing wall A by screws 17 inserted through holes 16 of base member 12, such that lateral extremity 12b of base member 12 abuts against spacing portion Fsp of furring strip F. The horizontal spirit level 20 can be used to help the mason set up the guiding tool 10 such that its elongated base member 12 be arranged in a horizontal position. Spacer plates 18, 18', which extend perpendicularly to flanges 14, 14' away from backing wall A, allow ruler 30 to clear spacing portion Fsp of furring strip F.

As shown in FIG. 3, guiding tool 10 is typically placed at or near the top of backing wall A so that it does not obstruct the application of the brick adjacently thereto and so that it need not be upwardly moved during such application.

Once the thickness of the brick or other masonry block to be applied is determined (typically 4½ inches for brick and 5½ inches for stone for example), the mason uses measuring scale 35 to position plumb line L at a predetermined distance from the backing wall A. The looped top end of plumb line L has a loop knot at its top end and carries a plumb bob B at its lower end. The mason can slip the loop knot of the plumb line L around the notched plumb line support portion 34, until it is retained by a selected notch 36 thereon registering with the reading on the measuring scale 35 corresponding to the thickness of the brick to be applied. The plumb line L extends tautly downwardly therefrom in a vertical direction to establish the vertical plane of the masonry surface to be applied.

Moreover, elbowed ruler 30 can be slidably displaced relative to base member 12 in order to horizontally displace the vertically extending plumb line L towards the desired position along a direction parallel to ruler sliding axis 26. For example, in FIG. 3, where tool 10 is used for plumbing a corner of masonry wall M, guiding tool 10 is positioned adjacently to backing wall corner C, and the mason can slide ruler 30 along ruler sliding axis 26 towards the desired position of the corner of the brick wall, while using measuring scale 33 to know at which distance to position plumb line L from the backing wall corner C.

Once the bricks forming the masonry corner have all been laid and the masonry corner is erected, the mason proceeds to lay the brick for the rest of the masonry wall M. To be able to plumb his brick-laying job directly while it is being achieved, the mason can slidably displace elbowed ruler 30 relative to base member 12 (after having loosened and retightened set screw 28), while the looped end of plumb line L remains engaged in the same notch 36 of the plumb line support portion 34, in order to move plumb line L towards a not-yet-bricked area. The plumb line L can thus be easily moved to another position to continue assembling the bricks of the masonry wall, simply by loosening set screw 28, sliding ruler 30, and retightening screw 28 to releasably immobilize the ruler.

Generally, with the guiding tool 10 of the present invention, it is possible to easily displace the plumb line to the desired position along two axial directions:
- a first axial direction, parallel to the ruler sliding axis 26, to backing wall A and to the masonry wall M being built. Plumb line L can be moved along this first direction by sliding elbowed ruler 30 along ruler sliding axis 26 relative to the ruler mounting portion 22 of base member 12;
- a second axial direction, i.e. the longitudinal axis 38 of plumb line support portion 34, transversal to backing wall A and to the masonry wall being built. Plumb line L can be moved in this second direction by moving the looped end of the plumb line L axially along plumb line support portion 34 between notches 36. The distance of at which plumb-line L must be positioned along plumb line support portion 34 depends on the thickness of the masonry being applied and the thickness of air layer, if any, between the masonry wall M and the backing wall A.

A useful feature of guiding tool 10 is that since the ruler retaining channel 24 opens at both ends of the base member's ruler retaining portion 22, ruler mounting portion 32 can be inserted in ruler retaining channel 24 from either ends 24a or 24b thereof. Indeed, ruler 30 can be extracted out of the ruler retaining channel 24 outwardly of the end thereof from which it was initially inserted, e.g. from ruler retaining channel end 24a in FIG. 1, flipped around 180° and inserted from the other end of the ruler retaining channel 24, e.g. from ruler retaining channel end 24b, hence doubling the span of possible positions that the plumb line L can take without having to move the base member 12.

It is understood that above-described embodiment of guiding tool 10 can be modified without departing from the scope of the appended claims. Other methods than inserting screws in the screw holes for affixing the present invention to the backing wall may be used. In addition, other means for attaching a plumb line to the plumb line support portion of the elbowed ruler may be used, such as hooks placed underneath therefrom to which plumb line L may be attached.

Figure 4:
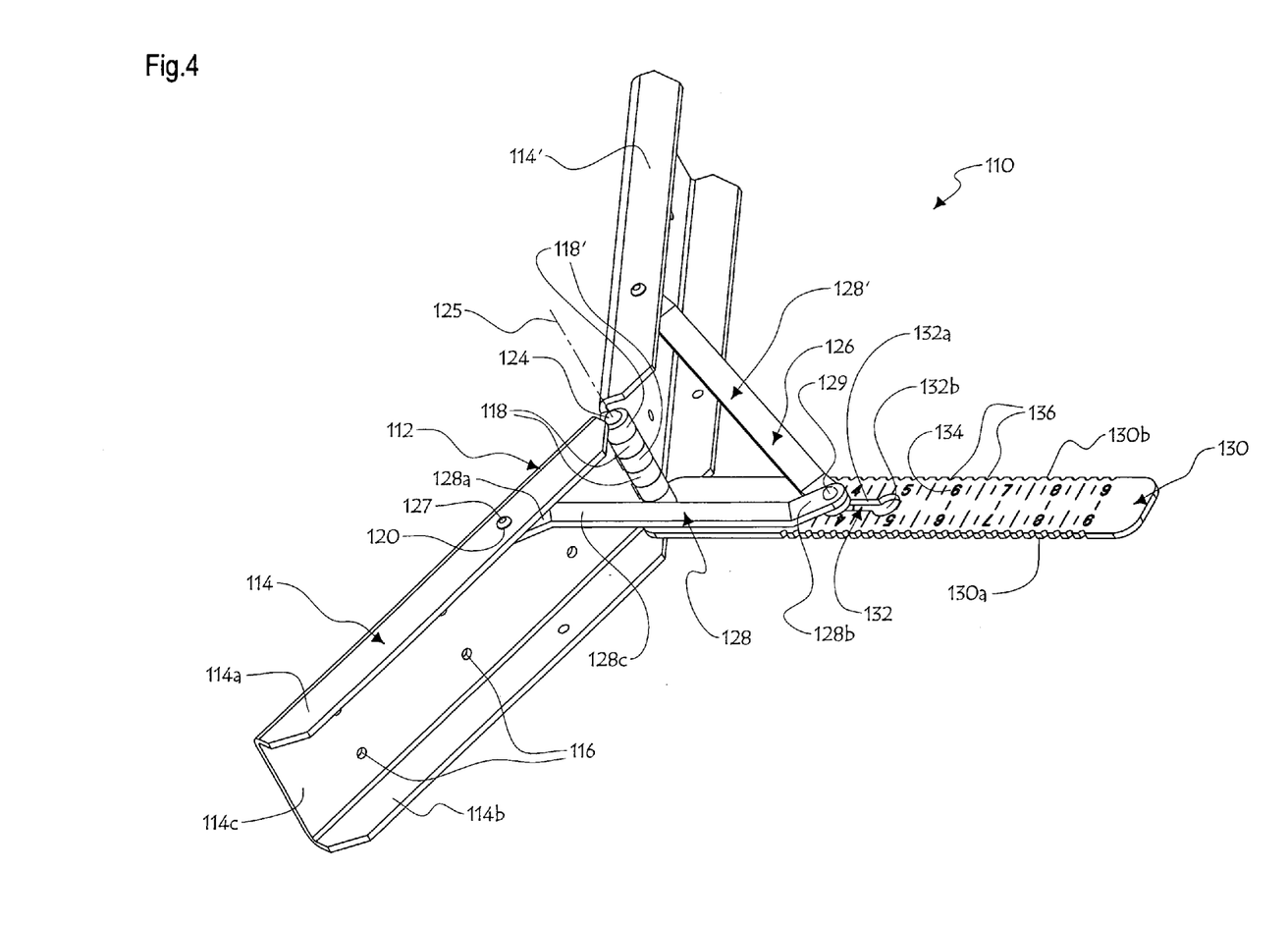
FIG. 4 is a bottom front perspective view of another embodiment of the masonry guiding tool.
Figure 5:
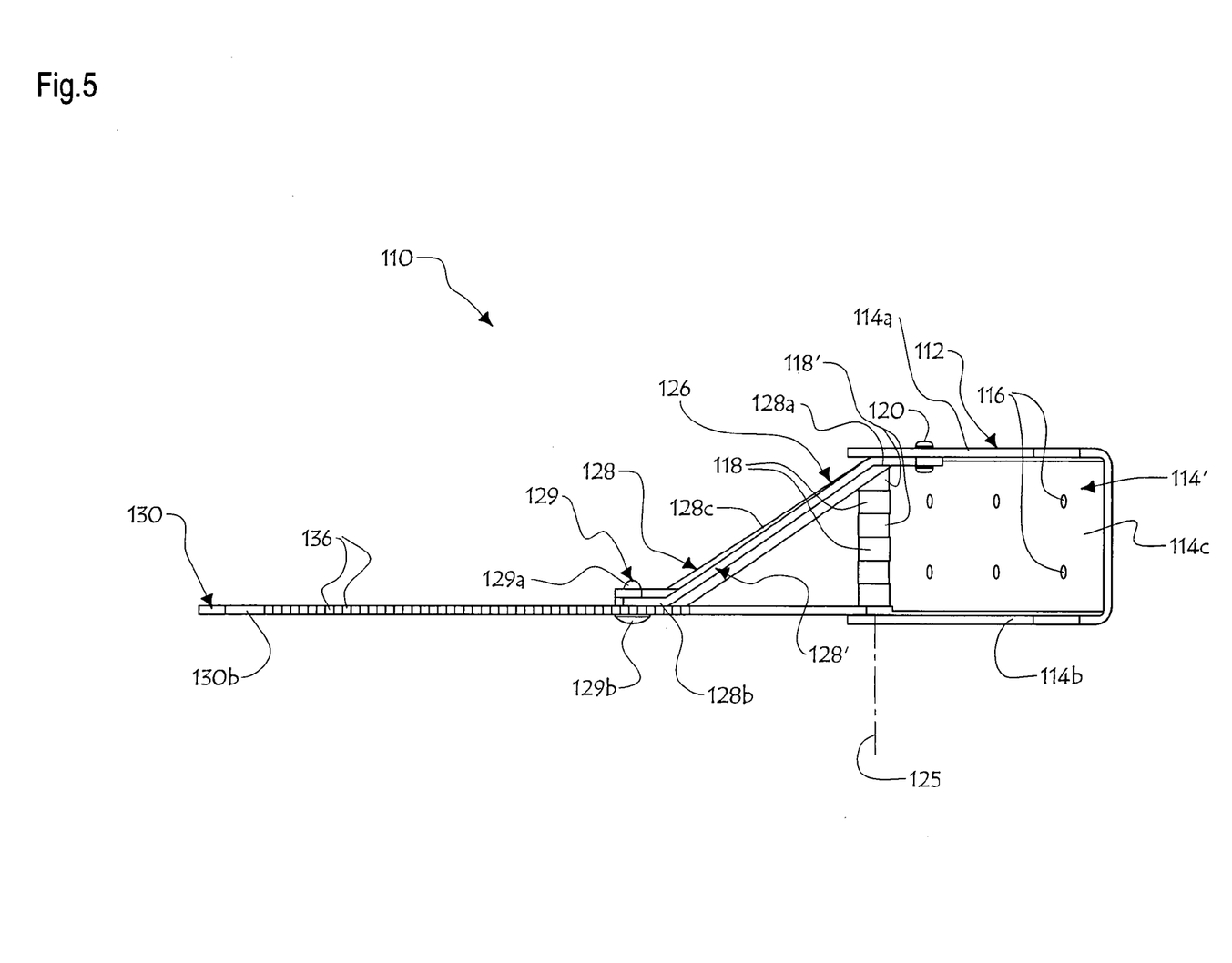
FIG. 5 is a side elevation of the guiding tool of FIG. 4.
Figure 6:
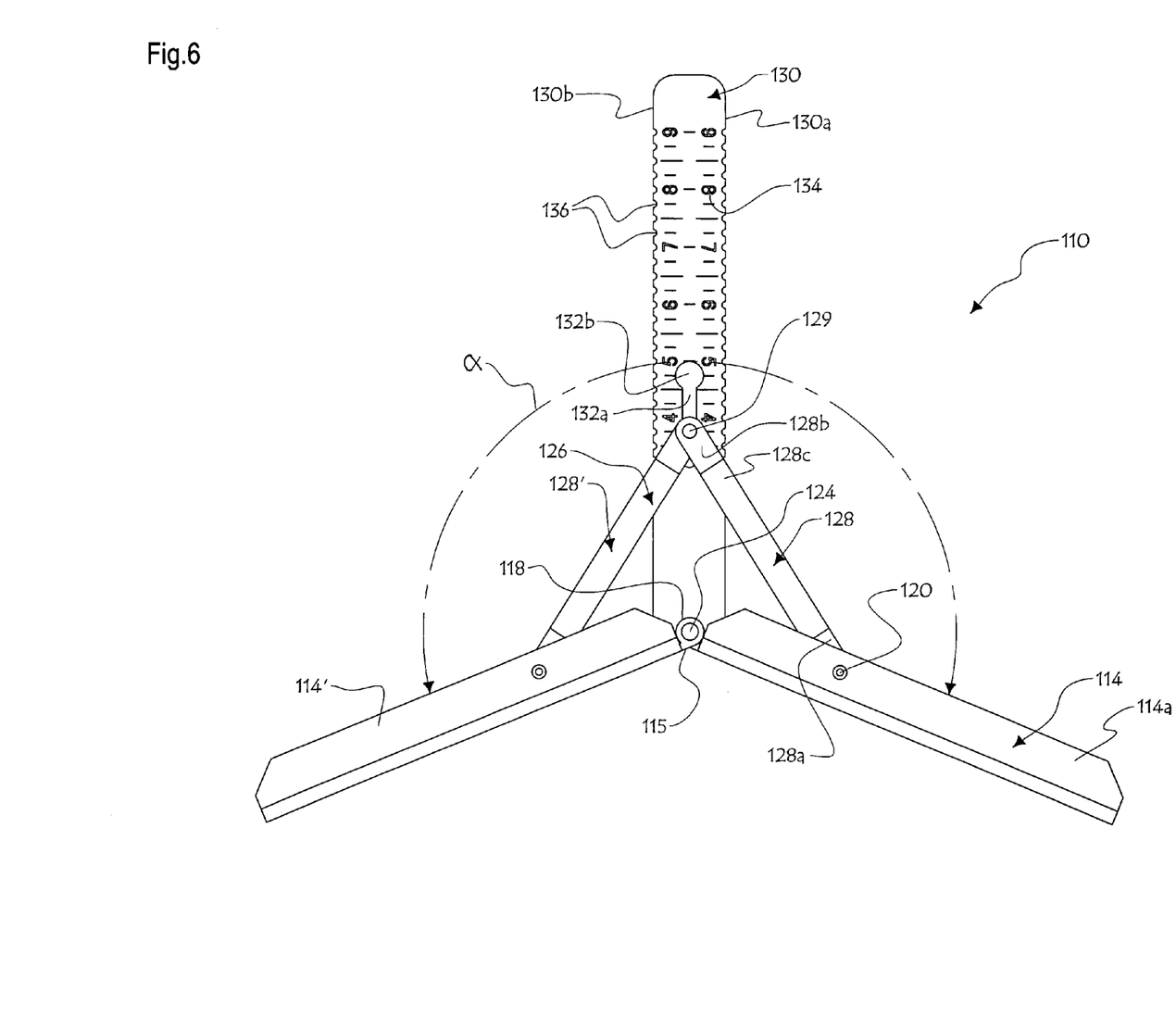
FIG. 6 is a top plan view of the guiding tool of FIG. 4.

FIGS. 4-6 show a masonry corner guiding tool 110 according to another embodiment of the present invention, for installation at the corner C of two intersecting sides of a backing wall A (FIG. 6). Guiding tool 110 comprises a base member 112 to which is linked an elongated, substantially planar ruler 130 defining lateral edges 130a, 130b.

Base member 122 comprises two wall attachment members in the form of two pivotally interconnected elongated wall attachment wings 114, 114'. Each of the attachment wings 114, 114' is substantially the same in construction and a symmetrical reproduction of the other and although only attachment wing 114 will be detailed herein after, it is understood that a similar description would also fit the other attachment wing 114'. Attachment wing 114 is of C-shaped cross-section, and defines a pair of substantially parallel first and second flanges 114a, 114b extending perpendicularly from opposite edges of a wall-bearing portion 114c. A number of screw holes 116 are made through wall-bearing portion 114c, and a pivot hole 120 is made in attachment wing first flange 114a. A series of spaced-apart coaxial hinge eyelets 118 are provided on the inner end of wing 114. The series of eyelets 118' of the other attachment wing 114' are in a slightly shifted position with respect to the series of eyelets 118 of attachment wing 114, in order for both series of eyelets 118 and 118' to fit complementarily in an intertwined and alternating fashion, and form in combination an elongated channel traversed by an elongated kingpin 124 hingedly interconnecting attachment wings 114 and 114'. Kingpin 124 extends integrally perpendicularly from the inner end portion of ruler 130. Attachment wings 114, 114' and ruler 130 are thus all pivotally interconnected about kingpin 124 and are all pivotable relative to each other about a pivot axis 125 running along kingpin 124. Attachment wings 114 and 114' meet at a corner-bearing edge 115 of base member 112 (FIG. 6) which is destined to be aligned with and applied directly against the corner C of backing wall A when guiding tool 110 is installed thereon.

Guiding tool 110 further comprises a linkage 126 linking each one of attachment wings 114, 114' to central ruler 130. Linkage 126 comprises linkage rods 128 and 128' each linking attachment wings 114 and 114' respectively to the elongated ruler 130. Although only one linkage rod 128 will be described hereinafter, it is understood that a similar description would fit the other linkage rod 128' which is a symmetrical reproduction of linkage rod 128. Linkage rod 128 defines a pierced first end portion 128a through which extends a pivot pin 127, which also extends through pivot hole 120; this ensures a fixed but pivotal connection of linkage rod 128 to attachment wing 114. Linkage rod 128 also comprises a downwardly slanting intermediate portion 128c extending from first end portion 128a to a second end portion 128b. This second end portion 128b of linkage rod 128 is also pierced and traversed by a gudgeon pin 129, and more particularly by the shank portion 129a thereof, which also traverses the second end portion 128b of linkage rod 128', and extends through a groove 132 made in ruler 130. Gudgeon pin 129 also defines a head portion 129b (FIG. 5) located about the surface of ruler 130 opposite the second end portion 128b of linkage rods 128, 128'.

Groove 132 is parallel to and evenly spaced from lateral edges 130a, 130b of ruler 130. Groove 132 defines a narrow elongated main portion 132a and a larger, rounded eyelet portion 132b. Groove main portion 132a is slightly wider than the shank portion 129a of gudgeon pin 129 to allow the latter to be freely slidable therein, but is narrower than its head portion 129b to retain gudgeon pin 129 therein. On the other hand, eyelet portion 132b is wider than both the shank portion 128a and the head portion 128b of gudgeon pin 129, to allow the removal of gudgeon pin 129 from groove 132 to allow wings 114, 114' to collapse against ruler 130 in an inoperative position when tool 110 is stored.

Gudgeon pin 129 can thus slidably engage ruler groove 132 in an operative condition of tool 110. When gudgeon pin 129 accordingly slidably engages ruler groove 132, linkage 126, by the pivotal connection of its rods 128, 128' to attachment wings 114, 114' at one end and to gudgeon pin 129 at the other end, ensures that the angular distance between attachment wing 114 and ruler 130, and the angular distance between attachment wing 114' and ruler 130 remain equal. Indeed, since (1) linkage rods 128, 128' are of substantially equal length; and (2) the distance between the pivotal interconnection of rod 128 to attachment wing 114 (pivot pin 127) and the distance between the pivotal interconnection of rod 128' to attachment wing 114', are substantially the same, then the locus of the pivotally interconnected end portions 128b of linkage rods 128 and 128' when attachment wings 114, 114' are pivoted relative to each other will be the bisector of the angle α (FIG. 6) formed between attachment wings 114, 114'. In other words, gudgeon pin 129 will always be substantially positioned on the bisector of angle α, whatever the relative pivotal position of attachment wings 114 and 114'. Accordingly, gudgeon pin 129, which engages the ruler's groove 129, will force the ruler to remain substantially aligned with the bisector of the angle α formed between attachment wings 114 and 114'.

It is noted that as attachment wings 114, 114's are spread apart from an initial position such as the one shown in FIG. 4, gudgeon pin 129 will slide within groove 132 in the direction of the outer free end of ruler 130; on the other hand, as attachment wings 114, 114's are folded towards each other and away from ruler 130, gudgeon pin 129 will move in the direction of kingpin 124.

Thus, when gudgeon pin 129 engages groove 132, ruler 130 always bisects the angle formed between attachment wings 114 and 114', whatever the angular spread between the attachment wings 114, 114'.

Ruler 130 also comprises a number of notches 136 made inwardly on edges 130a and 130b of elongated ruler 130, destined to prevent the looped end of plumb line L slipped around ruler 130 from sliding freely therealong and retain it position.

Ruler 130 also comprises a measuring scale 134 whose zero point coincides with the corner-bearing edge 115 of base member 112, at the intersection of attachment wings 114 and 114'.

Accordingly, when guiding tool 110 is installed on corner C of a backing wall A, the graduations of measuring scale 134 indicate distances from corner C itself.

Figure 7:
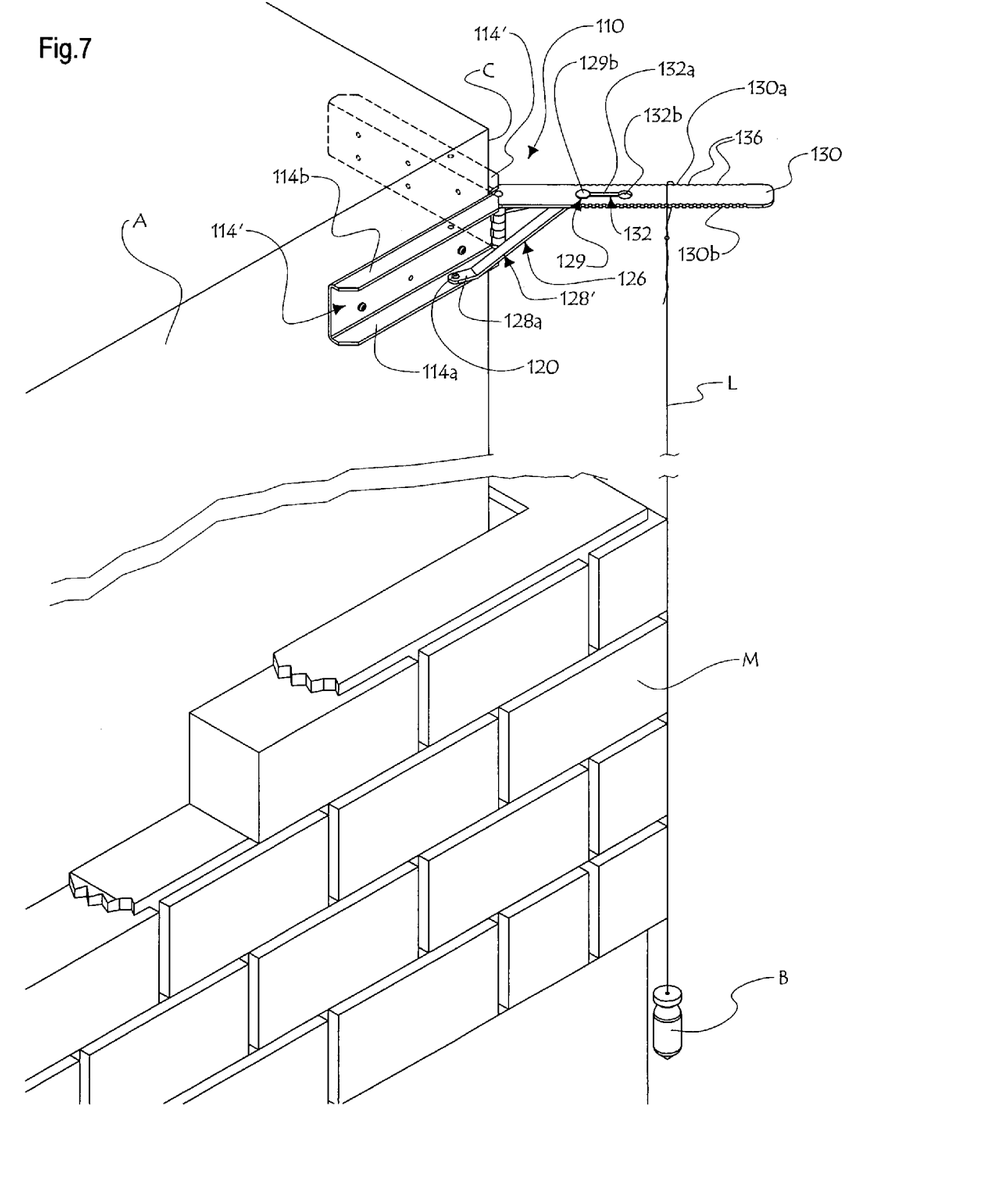
FIG. 7 is a top front perspective view at a smaller scale of the guiding tool of FIG. 4 holding a plumb line and installed at the corner of two intersecting sides of a backing wall.

FIG. 7 shows guiding tool 110 used on a corner C of a backing wall A. Guiding tool 110 is typically placed at the top of backing wall A so that it does not obstruct the application of the brick thereto and does not need to be upwardly moved during such application. To install guiding tool 110 on a wall, each attachment wing 114, 114' is affixed, by inserting screws into screw holes 116 thereof, to a corresponding one of the two intersecting sides of the backing wall A forming corner C such that corner-bearing edge 115 be applied against corner C. During the fixation of the base member 112 to backing wall A, linkage 126 will ensure, as described above, that ruler 130 remains equiangularly spaced from both attachment wings 114 and 114', i.e. ruler 130 always bisects the angle formed therebetween. For example, if the guiding tool 110 is installed on a corner C between two intersecting sides of backing wall A which form an angle of 90°, the angle between attachment wings 114, 114' will be of 270°, and the angles formed between each attachment wings 114, 114' and the central ruler 130 will both be of 135°.

The looped end at the top of a plumb line L is then slipped around ruler 130. The mason can use the measuring scale 134 on ruler 130 to position the plumb line L at the desired distance from the corner C of the backing wall A. The mason can then start to assemble the bricks at the corner of masonry wall M, using the plumb line L as a vertical reference line. The resulting corner of the masonry wall M built by the mason should be aligned with vertical plumb-line L.

Guiding tool 110 is advantageous in that it saves the mason from having to manually measure the angle with a protractor between the attachment wings 114, 114' and elongated ruler 130 in order to position the latter in equiangularly-spaced fashion from both of attachment wings 114 and 114'. Indeed, once the attachment wings are attached to the corners of the backing wall, the ruler 130 is already positioned so as to bisect the angle formed between attachment wings 114, 114'.

It is noted that guiding tool 110 can be used on the corner of any backing wall, whatever the angle between the two intersecting sides of the backing wall onto which the guiding tool's base member 112 is attached. Indeed, whatever the angle between the two intersecting sides of the backing wall, and thus whatever the angle between attachment wings 114, 114' attached thereto, elongated ruler 130 will always remain, through the instrumentality of linkage rods 128, 128', on the bisector of the angle formed between the two attachment wings 114, 114', and thus the angle formed between the two intersecting sides of the backing wall. It is noted that in an alternate embodiment (not shown), by providing a longer groove 132 extending towards the outer free edge of ruler 130, wings 114, 114' could moreover form acute angles with ruler 130 for allowing tool 110 to be used on converging wall configurations.

It is understood that additional modifications to the above embodiment of guiding tool 110 could be made without departing from the scope of the appended claims. For example:

- The attachment wings could have any suitable shape. For example, they could be planar and plate-shaped instead of having a C-shaped cross-section;
- The ruler 130 could be cylindrical instead of being plate-shaped. In this embodiment, the second ends of the linkage rods could be pivotally connected to a unitary tubular and hollow ring-shaped sleeve instead of a gudgeon pin. This unitary tubular sleeve would be slidably slipped around the cylindrical ruler, and would axially slide therealong as the attachment wings are pivoted relative to each other so as to maintain the ruler equiangularly spaced from the attachment wings. Generally, the ruler could have any suitable shape, and the unitary member to which the second end portions of the linkage rods are pivotally connected could have any suitable shape as long as it pivotally carries the second ends of the linkage rods and is axially movable along the elongated ruler when the attachment wings are pivoted relative to each other.
- The linkage could comprise more than two symmetrically arranged rods. For example, the linkage could comprise four rods, a first pair of rods linking a first attachment wing to the ruler, and a second pair of rods linking the second attachment ring to the ruler. Generally, the linkage could be composed of any number of linkage rods as long as all linkage rods collaborate to maintain the ruler equiangularly spaced from both attachment wings. The linkage could additionally include springs or other biasing member forcing some linkage rods in specific directions, and if multiple rods are used, more than one attachment of the rods to either or both the ruler and the wings could exist.

The embodiments of the present invention, in which an exclusive property or privilege is claimed, are defined as follows:

1. A masonry guiding tool for attachment to a backing wall and for use with a plumb line, comprising:
   a base member, for attachment to the backing wall, said base member defining two ends and a retaining channel which has openings at both said two ends of said base member; and
   an elbowed plumb line holder, comprising an elongated mounting portion defining a first axis in therealong, said mounting portion movably carried by said base member in said retaining channel and axially movable relative thereto to said base member along said first axis which is destined to be parallel to the backing wall, said plumb line holder also comprising an elongated plumb line support portion transversally connected to said mounting portion, said elongated plumb line support portion defining and extending along a second axis transversal to said first axis, said plumb line support portion for movably holding a the plumb line;
wherein said guiding tool is for allowing the plumb line to be movable along said first axis by axially moving said mounting portion relative to said base member, and wherein said plumb line support portion is destined to movably carry the plumb line in order for the plumb line to be movable along said second axis of said plumb line support portion, and wherein said plumb line support portion can be selectively positioned beyond either one of said two ends of said base member along said first axis by allowing said mounting portion to extend through either one of said retaining channel openings partly into said retaining channel and partly out of said retaining channel.

2. The masonry guiding tool according to claim 1, wherein said mounting portion and plumb line support portion are perpendicular to each other, and said first and said second axes are thus also perpendicular.

3. The masonry guiding tool according to claim 1, wherein said plumb line support portion defines a number of notches longitudinally spaced-apart therealong for engagement by a looped end of the plumb line.

4. The masonry guiding tool according to claim 1, wherein said mounting portion and said plumb line support portion are each substantially flat.

5. The masonry guiding tool according to claim 1, wherein said base member defines a wall attachment portion for attachment to the backing wall, a spacer portion attached to said wall at attachment portion and carrying in turn a plumb line holder retaining portion defining said retaining channel and attached to said spacer portion in spaced apart fashion from said wall attachment portion, said plumb line holder retaining portion thus carrying said mounting portion of said plumb line holder in spaced apart fashion from said wall attachment portion.

6. The masonry guiding tool according to claim 1, wherein said plumb line holder retaining portion is elongated and defines two ends and comprises a plumb line holder retaining channel extending between said two ends along said first axis and wherein said elongated plumb line support portion is slidably mounted in said plumb line holder retaining channel.

7. The masonry guiding tool according to claim 1, further comprising a spirit level attached to said base member.

8. The masonry guiding tool according to claim 1, further comprising releasable fixing means capable of releasably immobilizing said plumb line holder relative to said base member.

9. The masonry guiding tool according to claim 1, wherein said plumb line support portion of said plumb line holder is graduated.

10. The masonry guiding tool according to claim 1, wherein said mounting portion of plumb line holder is graduated.

11. A masonry guiding tool for attachment to a backing wall, comprising:
    a base member, for attachment to the backing wall, said base member defining two ends and a retaining channel which has an opening at both said two ends of said base member;
    an elbowed plumb line holder, comprising an elongated mounting portion defining a first axis therealong, said mounting portion movably carried by said base member in said retaining channel and axially movable relative thereto said base member along said first axis which is destined to be parallel to the backing wall, said plumb line holder also comprising an elongated plumb line support portion transversally connected to said mounting portion, said elongated plumb line support portion defining and extending along a second axis transversal to said first axis; and
    a plumb line movably carried by said plumb line support portion of said plumb line holder;
wherein said plumb line can be moved along said axis by axially moving said mounting portion relative to said base member, and said plumb line is movably carried by said plumb line support portion of said plumb line holder and is thus movable along said second axis of said plumb line support portion, and wherein said plumb line support portion and consequently said plumb line can be selectively positioned beyond either one of said two ends of said base member along said first axis by allowing said mounting portion to extend through either one of said retaining channel openings partly into said retaining channel and partly out of said retaining channel.

* * * * *